United States Patent
Niehues (10) Patent No.: US 7,850,418 B2
(45) Date of Patent: Dec. 14, 2010

(54) SYSTEM AND METHOD TO FACILITATE MAINTENANCE ON A WIND TURBINE

(75) Inventor: Thomas Niehues, Neuenkichen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/607,615

(22) Filed: Oct. 28, 2009

(65) Prior Publication Data

US 2010/0135792 A1 Jun. 3, 2010

(51) Int. Cl.
*F03D 11/04* (2006.01)
(52) U.S. Cl. .................. 415/121.3; 416/DIG. 6
(58) Field of Classification Search .............. 415/121.3; 416/DIG. 6
See application file for complete search history.

(56) References Cited

U.S. PATENT DOCUMENTS 6,357,549 B1 * 3/2002 Brennan et al. ............. 182/133

| 2003/0071469 | A1 * | 4/2003 | Becker .................. 290/55 |
| 2007/0200103 | A1 | 8/2007 | Viladomiu i Guarro et al. |
| 2008/0257844 | A1 | 10/2008 | Llorente Gonzalez et al. |

FOREIGN PATENT DOCUMENTS

| DE | 767003 C | 4/1951 |
| DE | 7623019 U1 | 5/1978 |

* cited by examiner

*Primary Examiner*—Richard Edgar
(74) *Attorney, Agent, or Firm*—Armstrong Teasdale LLP (57) ABSTRACT

A system to facilitate maintenance on a wind turbine including a control assembly positioned within a tower defining an access opening. The system includes at least one rail comprising a first rail portion and a second rail portion coupled to the first rail portion. The second rail portion extends outwardly through the access opening when coupled to the first rail portion. At least one wheel is coupled to the control assembly. The wheel is configured to engage the rail and enable movement of the control assembly along the rail to facilitate movement of the control assembly between an interior and an exterior of the tower.

20 Claims, 7 Drawing Sheets

SYSTEM AND METHOD TO FACILITATE MAINTENANCE ON A WIND TURBINE

BACKGROUND OF THE INVENTION

The subject matter described herein relates generally to wind turbines and, more particularly, to performing maintenance operations on wind turbines.

Known wind turbines are used to convert kinetic energy in wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the wind speed. On large wind turbines, such as wind turbines having a rated power of 100 kilowatts (kW) to 150 kW, the voltage generated by the turbine is usually alternating current (AC). The current is subsequently sent through a transformer positioned within and operatively coupled to the wind turbine to raise the voltage to within a range of about 10,000 volts to about 30,000 volts, depending upon the standard in the local electrical grid.

Currently, conventional cranes are required to lift and maneuver the transformer, as well as other components of a wind turbine, such as generators and gearboxes, during maintenance operations. However, due to the size and weight of the typical crane, the crane is not well suited for lifting and/or maneuvering these components within and/or around the wind turbine tower. Further, the crane may be expensive to operate, and additional costs may also be incurred to transport the crane to the wind turbine site. Moreover, cranes configured for wind turbine maintenance are limited in number and may be difficult to acquire when maintenance is needed, causing a potentially lengthy and expensive downtime for the wind turbine.

BRIEF DESCRIPTION OF THE INVENTION

In one aspect, a system to facilitate maintenance on a wind turbine including a control assembly positioned within a tower defining an access opening is provided. The system includes at least one rail including a first rail portion and a second rail portion coupled to the first rail portion. The second rail portion extends outwardly through the access opening when coupled to the first rail portion. At least one wheel is coupled to the control assembly. The wheel is configured to engage the rail and enable movement of the control assembly along the rail to facilitate movement of the control assembly between an interior and an exterior of the tower.

In another aspect, a wind turbine is provided. The wind turbine includes a tower defining an access opening. A control assembly is positioned within said tower. The wind turbine also includes a rail assembly including at least one rail having a first rail portion and a second rail portion coupled to the first rail portion. The second rail portion extends outwardly through the access opening when coupled to the first rail portion. At least one wheel is coupled to the control assembly. The wheel is configured to engage the rail and enable movement of the control assembly along the rail to facilitate movement of the control assembly between an interior and an exterior of the tower.

In yet another aspect, a method is provided for performing maintenance on a wind turbine. The wind turbine has a tower defining an access opening. The method includes fixedly coupling a first rail portion within the tower. A second rail portion is coupled to the first rail portion to form a rail. The second rail portion extends outwardly through the access opening when coupled to the first rail portion. At least one wheel is coupled to the control assembly. The wheel is configured to engage the rail and enable movement of the control assembly along the rail to facilitate movement of the control assembly between an interior and an exterior of the tower.

BRIEF DESCRIPTION OF THE DRAWINGS

Non-limiting and non-exhaustive embodiments are described with reference to the following figures, wherein like reference numbers refer to like parts, components, or elements throughout the various views unless otherwise specified.

DETAILED DESCRIPTION OF THE INVENTION

Figure 1:
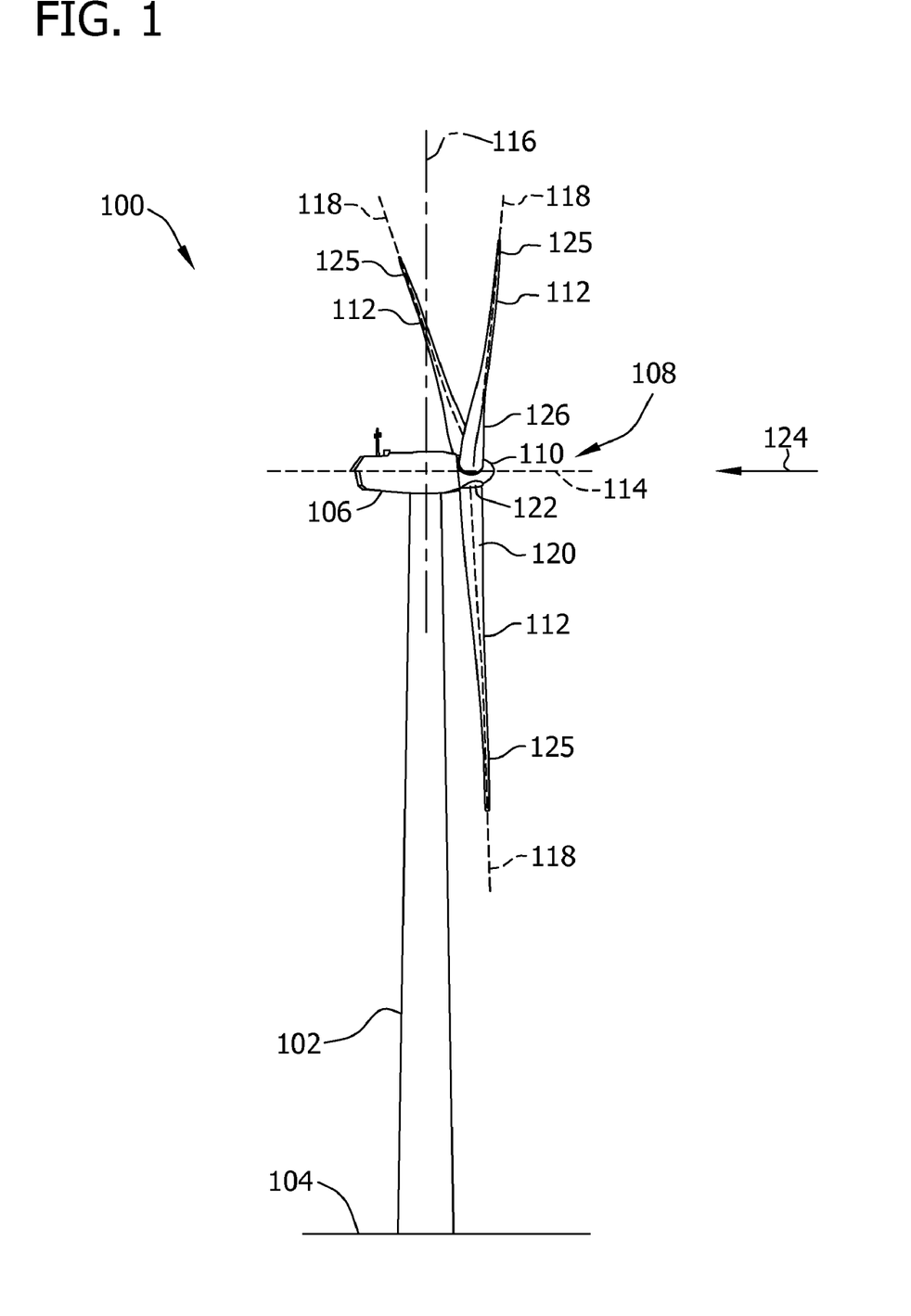
FIG. 1 is a side perspective view of an exemplary wind turbine.

FIG. 1 is a side perspective view of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a support surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine 100 to function as described herein. In the exemplary embodiment, tower 102 is fabricated from tubular steel and has a cavity (not shown in FIG. 1) extending between support surface 104 and nacelle 106. Alternatively, wind turbine 100 may include any suitable tower 102, such as a lattice tower or any known tower. Further, tower 102 may have any suitable height that enables wind turbine 100 to function as described herein. In one embodiment, wind turbine 100 is located at an on-shore location. Alternatively, wind turbine 100 may be located at an off-shore or a near-shore location.

Rotor blades 112 are positioned about rotor hub 110 to facilitate rotating rotor 108, thereby transferring kinetic energy from wind 124 into usable mechanical energy and, subsequently, electrical energy. Rotor 108 and nacelle 106 are rotated about tower 102 on a yaw axis 116 to control a perspective of rotor blades 112 with respect to a direction of wind 124. Rotor blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in rotor blades 112 are transferred to hub 110 via load transfer regions 122. Each rotor blade 112 also includes a blade tip portion 125.

In the exemplary embodiment, rotor blades 112 have a length between 30 meters (m) (98 feet (ft)) and 70 m (229 ft), however these parameters form no limitations to the instant disclosure. Alternatively, rotor blades 112 may have any suitable length that enables wind turbine 100 to function as described herein. For example, in certain embodiments rotor blade 112 may have a length less than 30 m or greater than 70 m, such as 100 m or greater in particular embodiments.

As wind 124 strikes each rotor blade 112, blade lift forces (not shown) are induced on each rotor blade 112 and rotation of rotor 108 about a rotational axis 114 is induced as blade tip portions 125 are accelerated. A pitch angle (not shown) of rotor blades 112, i.e., an angle that determines an angle of attack of rotor blade 112 with respect to a direction of wind 124, may be changed by a pitch adjustment mechanism (not shown in FIG. 1). Specifically, increasing a pitch angle of rotor blade 112 decreases the angle of attack and a blade surface area 126 exposed to wind 124 and, conversely, decreasing a pitch angle of rotor blade 112 increases the angle of attack and blade surface area 126 exposed to wind 124. The pitch angles of rotor blades 112 are adjusted about a pitch axis 118 at each rotor blade 112. In the exemplary embodiment, the pitch angles of rotor blades 112 are controlled individually. Alternatively, the pitch angles of rotor blades 112 are controlled as a group.

Figure 2:
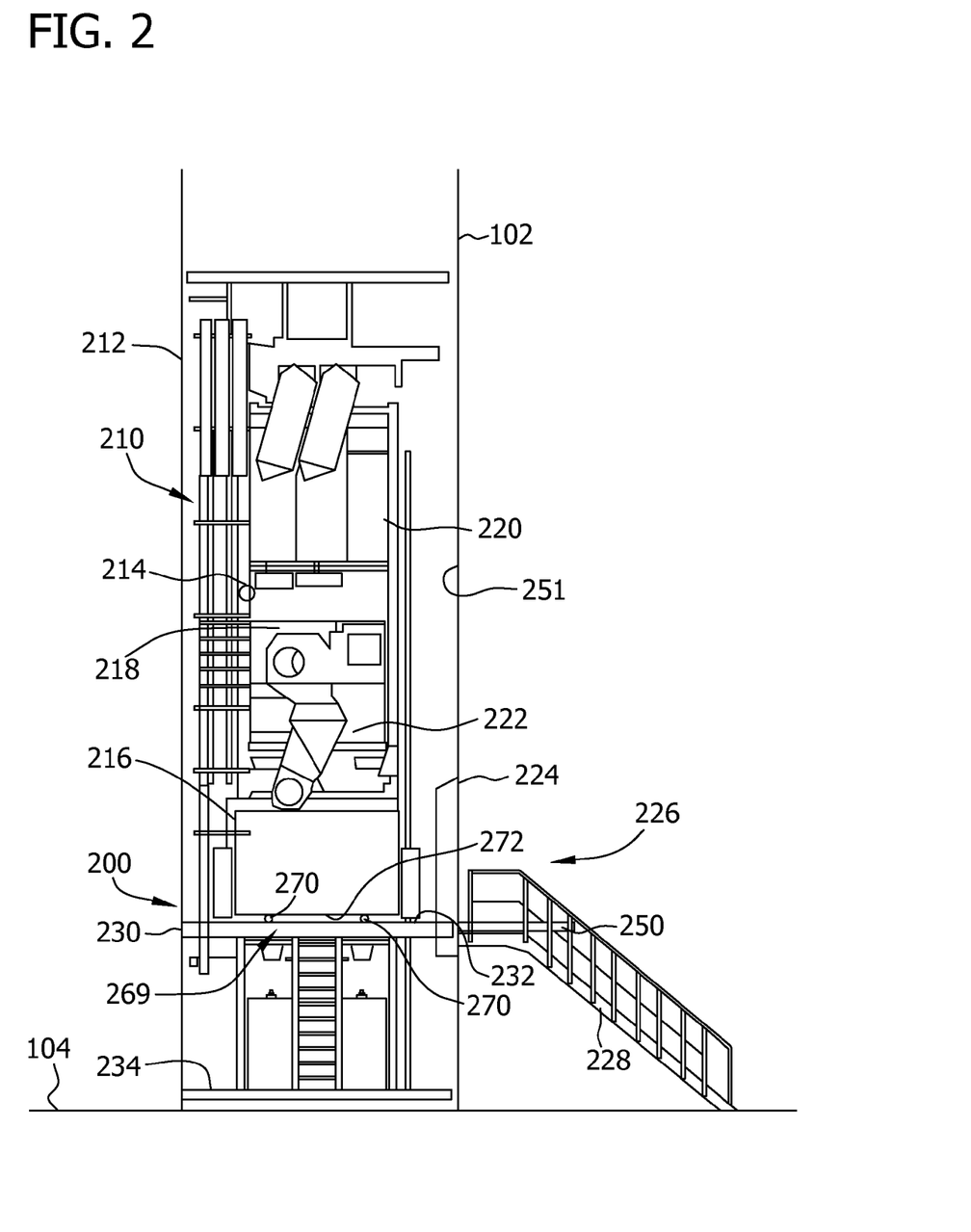
FIG. 2 is a partial sectional view of a tower of the wind turbine shown in FIG. 1.
Figure 3:
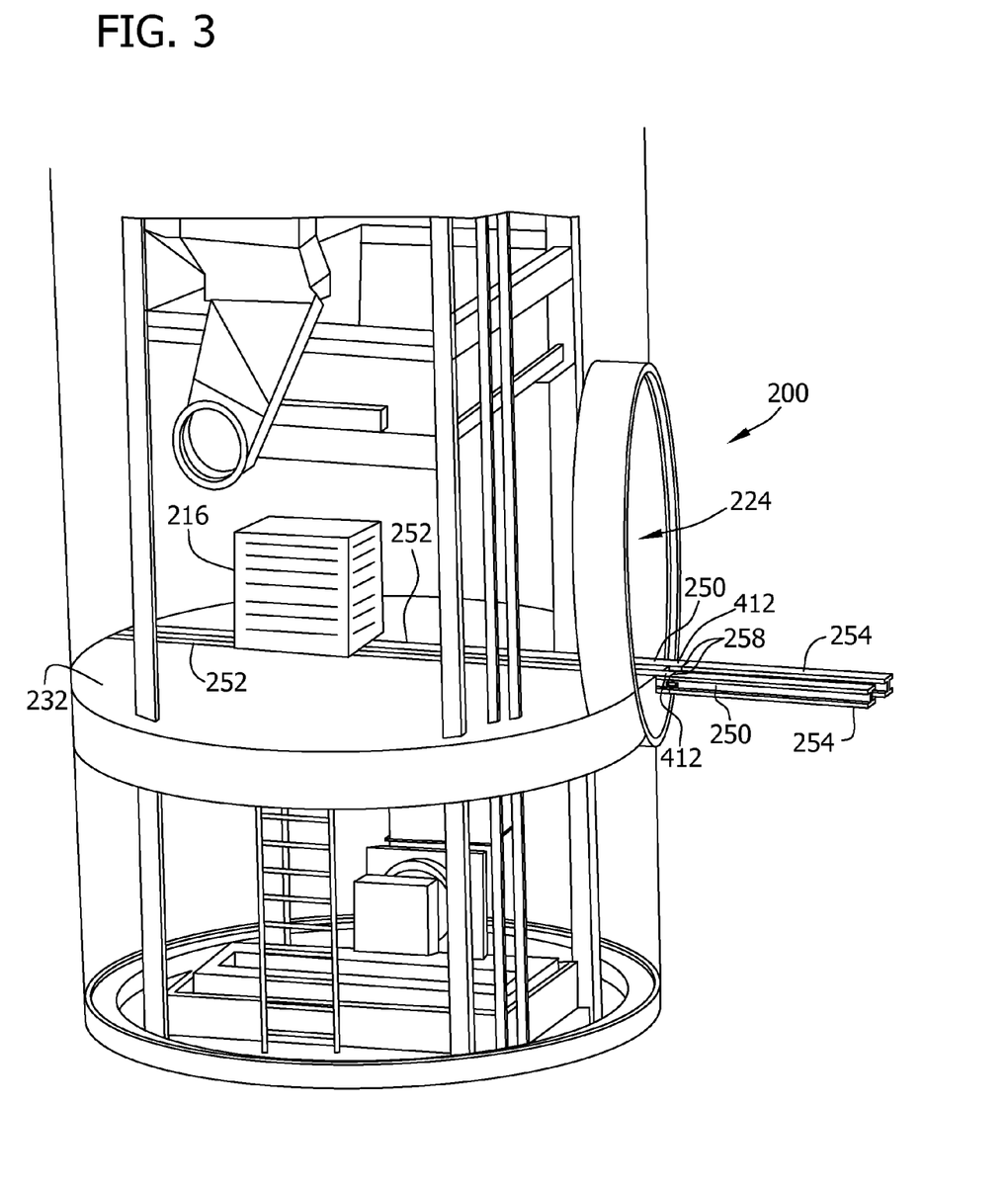
FIG. 3 is a perspective view of an exemplary system to facilitate performing maintenance operations on the wind turbine shown in FIG. 1.

FIG. 2 is a partial sectional view of exemplary tower 102 and FIG. 3 is a perspective view of an exemplary system 200 to facilitate performing maintenance operations on wind turbine 100 shown in FIG. 1. In the exemplary embodiment, tower 102 includes a pre-assembled power module (PPM) 210 that is positioned within a substantially cylindrical outer wall 212 of tower 102. In the exemplary embodiment, tower 102 includes a structural lattice frame 214 that houses wind turbine parts, components and control assemblies, including without limitation, a transformer 216, a switch gear 218, an electrical cabinet 220, and a frequency converter 222. Tower 102 defines an access opening 224 at a lower region 226 of PPM 210 that provides access to an interior of tower 102 to enable maintenance operations within tower 102. In the exemplary embodiment, a staircase 228 and/or suitable ramp extends from support surface 104 to access opening 224 to enable access to tower 102.

In the exemplary embodiment, transformer 216 is positioned on a first level 230 that includes a floor 232 such that access opening 224 provides access to tower 102 at floor 232. In alternative tower constructions or configurations, transformer 216 may be positioned on a lower level 234 at or near support surface 104, or at any suitable location within tower 102. In a particular embodiment, floor 232 is configured to rotate in a turn-table configuration, i.e., at least a portion of floor 232 rotates about a rotational axis, to enable movement of components, such as transformer 216, in any direction within tower 102.

In the exemplary embodiment, system 200 includes at least one rail 250 and, preferably, a plurality of rails 250 that are positioned along floor 232, as described herein. In the exemplary embodiment, rails 250 are substantially parallel and are mounted within tower 102 in a suitable orientation to facilitate movement of wind turbine components and control assemblies, such as transformer 216, along rails 250 and through access opening 224, as described in greater detail below.

As shown in FIG. 3, each rail 250 includes a first rail portion 252 fixedly coupled on and/or at least partially within floor 232 and a second rail portion 254 coupled to first rail portion 252 at a joint 258 at or near access opening 224. In the exemplary embodiment, second rail portion 254 is detachably or removably coupled to first rail portion 252 as desired. In alternative embodiments, second rail portion 254 is slideably or extendably coupled to first rail portion 252, such as in a telescoping configuration, or pivotally or rotatably coupled to first rail portion 252 using a suitable coupling or fastening device (not shown). In certain embodiments, second rail portion 254 can be retracted or decoupled from first rail portion 252 to facilitate storing second rail portion 254 when not in use.

In the exemplary embodiment, system 200 includes a wheel assembly 269 having at least one wheel 270 and, preferably, a plurality of wheels 270 as shown in FIG. 2, for example. Wheels 270 are coupled to a bottom surface 272 of transformer 216. Wheels 270 are sized and oriented to engage a respective rail 250 and enable movement of transformer 216 along rail 250. In the exemplary embodiment, transformer 216 is positioned on rails 250 during normal wind turbine operations. In a particular embodiment, in addition to or as an alternative to transformer 216, any suitable component or control assembly housed within tower 102 may be equipped with one or more wheels 270 that are sized and oriented to engage a corresponding rail 250.

Figure 4:
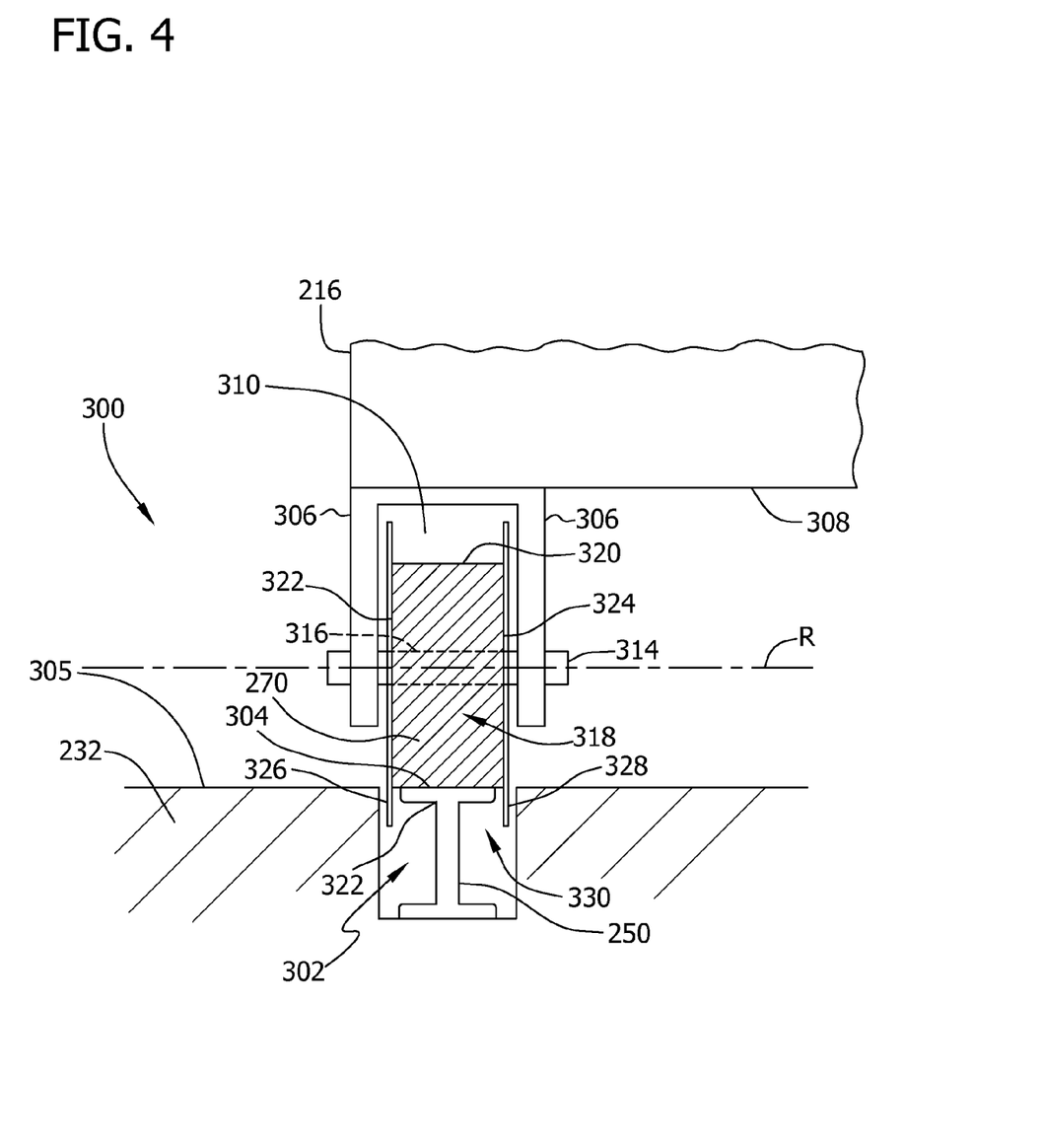
FIG. 4 is a schematic view of an exemplary wheel assembly for the system shown in FIG. 3.

FIG. 4 is a schematic view of an exemplary wheel assembly 300 of system 200 shown in FIG. 3. In the exemplary embodiment, floor 232 defines one or more channels 302. Each channel 302 is sized and oriented to receive a respective rail 250 such that a top surface 304 of rail 250 is substantially coplanar with a top surface 305 of floor 232 when rail 250 is positioned within channel 302. Wheel assembly 300 includes one or more support members 306 that extend from a lower surface 308 of transformer 216 to define a receptacle 310 that is sized to receive one or more wheels 270. An axle 314 rotatably couples wheel 270 to support member 306 and within receptacle 310. Axle 314 extends through support members 306 and through a bore or passage 316 defined through wheel 270 that defines an axis of rotation R.

In the exemplary embodiment, wheel 270 includes a substantially cylindrical central portion 318 having a peripheral surface 320 that extends between a first side surface 322 and a second side surface 324 of wheel 270. A first flange 326 is coupled to first side surface 322, and a second flange 328 is coupled to second side surface 324. First flange 326 and second flange 328, along with peripheral surface 320 form a recess 330 that is sized to receive a portion 332 of rail 250. During operation, first flange 326 and second flange 328 provide lateral support to transformer 216 when wheel 270 is placed on rail 250. In the exemplary embodiment, four wheel assemblies 300 are coupled to lower surface 308 of transformer 216. In this embodiment, two wheel assemblies 300 engage each respective rail 250 and provide sufficient stability to transformer 216. Alternatively, depending on a weight and/or dimensions of the rail-mounted control assembly, any suitable number of wheel assemblies 300 may be used to sufficiently support the control assembly and facilitate movement of the control assembly along rails 250. In an alternative embodiment, only one rail 250 is used as described herein. In this alternative embodiment, system 200 includes a lateral support member that extends, for example, from rail 250, floor 232 or a wall of tower 102, to provide additional support to the control assembly that is movably positioned on rail 250.

Figure 5:
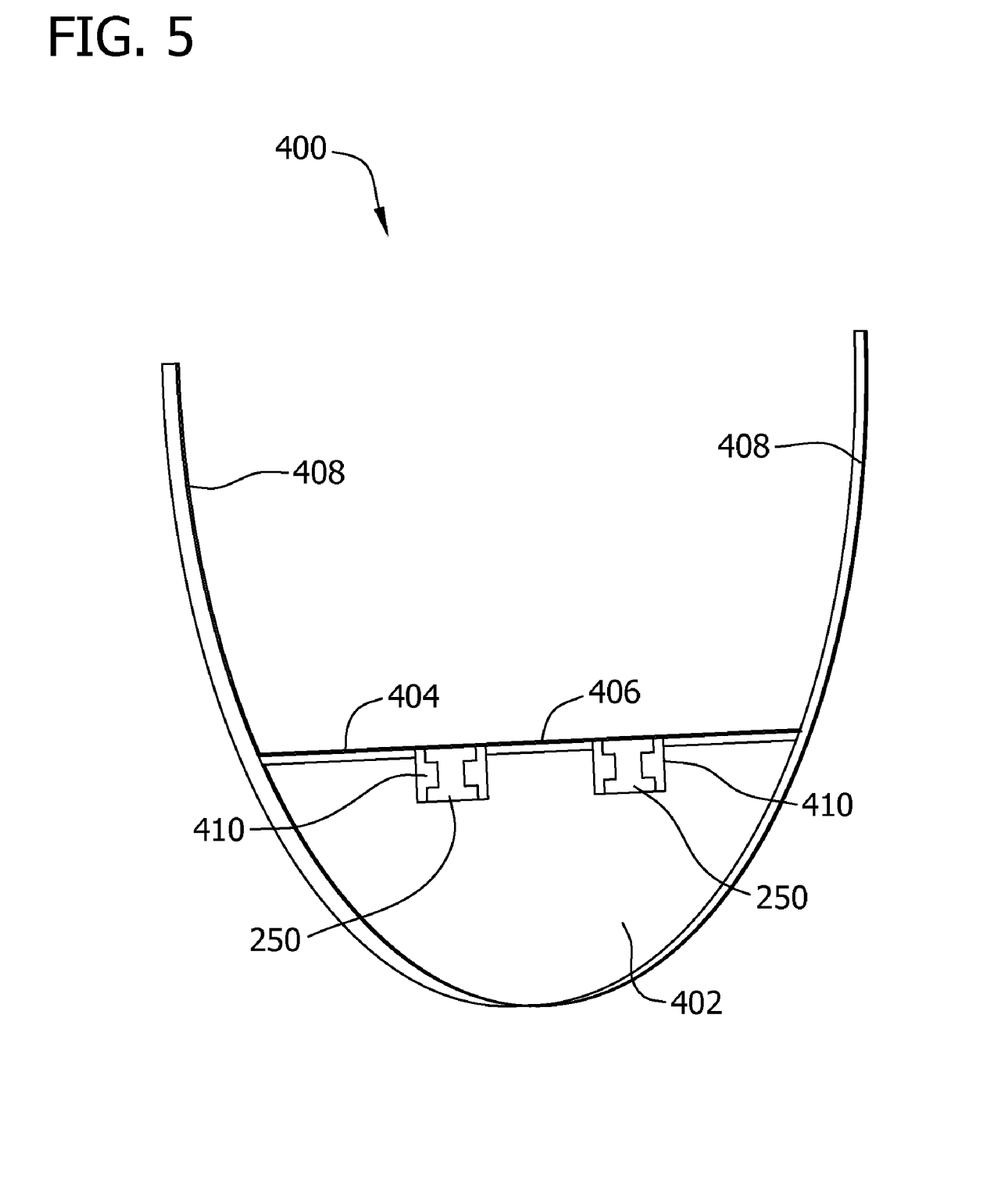
FIG. 5 is a schematic view of an exemplary door plate for the system shown in FIG. 3.

FIG. 5 is a schematic view of an exemplary door plate 400 of system 200 shown in FIG. 3. In the exemplary embodiment, door plate 400 includes a panel 402 having a top surface 404 that defines a foot board 406 of access opening 224. Door plate 400 includes a plurality of support arms 408 that extend upwardly from top surface 404 to partially define access opening 224. In the exemplary embodiment, one or more receptacles 410 are defined at or near top surface 404 and configured to receive a respective rail 250. As shown in FIG. 5, door plate 400 includes two receptacles 410 each configured to receive a corresponding rail 250. However, it should be apparent to those skilled in the art that door plate 400 may include a suitable number of receptacles 410 corresponding to the number of rails 250 used in system 200. Referring to FIGS. 3 and 5, in one embodiment, an end portion 412 of first rail portion 252 at or near joint 258 (not shown in FIG. 5) is positioned within corresponding receptacle 410 to provide stability to rail 250 during maintenance operations. In a particular embodiment, end portion 412 of first rail portion 252 is coupled to door plate 400 with one or more suitable fasteners, such as one or more screws or bolts (not shown). Second rail portion 254 extends outwardly from door plate 400 during maintenance operations as described in more detail herein.

Figure 6:
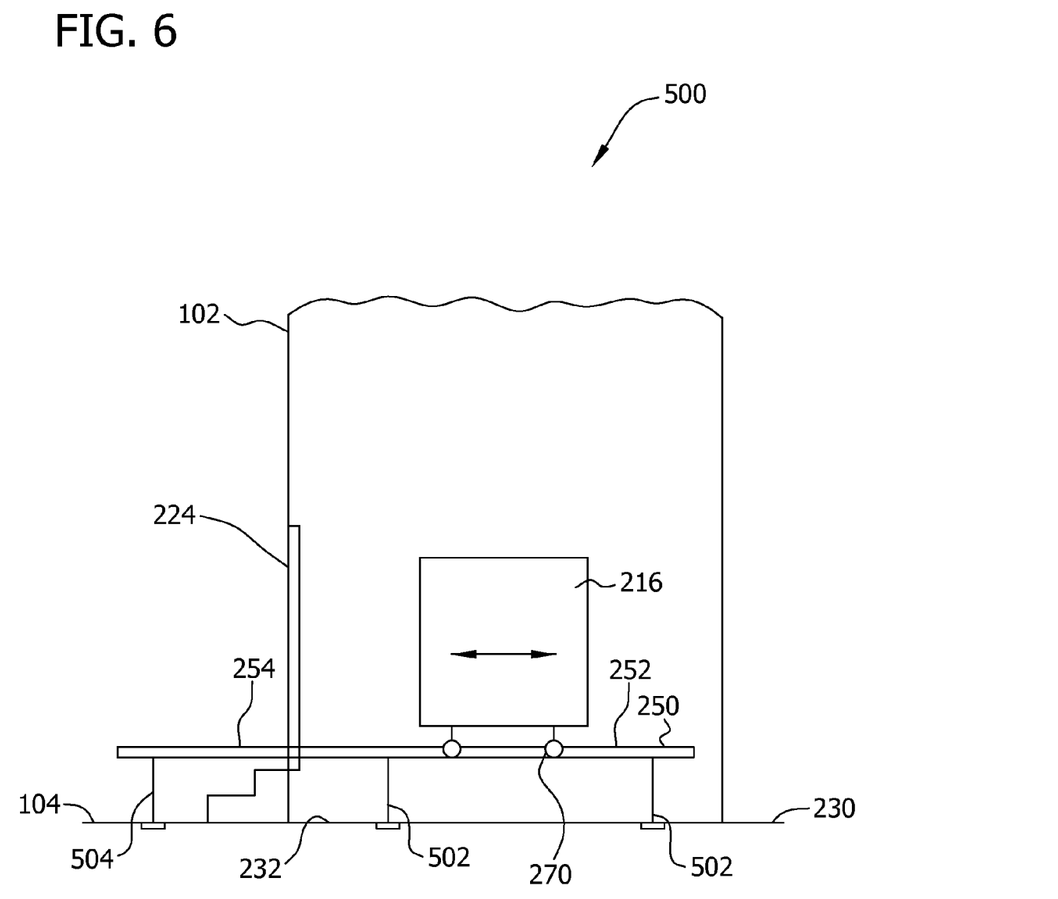
FIG. 6 is a schematic view of an alternative exemplary system to facilitate performing maintenance operations on the wind turbine shown in FIG. 1.

FIG. 6 is a schematic view of an alternative system 500 to facilitate performing maintenance operations on wind turbine 100 shown in FIG. 1. Referring to FIG. 6, when first level 230 of tower 102 is located below access opening 224, one or more supports 502 support first rail portion 252 of rail 250 in alignment with access opening 224. Supports 502 extend from floor 232 to first rail portion 252. Transformer 216 is then positioned on rail 250 using wheels 270 as described herein. Additionally, and in the illustrated embodiment, second rail portion 254 is supported by a leg 504 that extends from support surface 104 to second rail portion 254 and may be removed or moved, such as rotated or retracted, when second rail portion 254 is removed or retracted for storage during periods of non-use.

During maintenance operations to wind turbine 100, system 200 or system 500 may be used to move or reposition transformer 216, or another component or control assembly of wind turbine 100, from an operational position, as shown in FIG. 2 and in FIG. 5, outwardly through access opening 224 onto second rail portion 254 of rails 250. Repositioning transformer 216 provides maintenance personnel with added work space within tower 102 and facilitates performing maintenance operations on other internal control assemblies. Additionally, during maintenance operations, moving transformer 216 outside of tower 102 facilitates repairing and/or replacing transformer 216. During normal wind turbine operations, i.e., during periods when maintenance operations are not occurring, second rail portion 254 can be removed or retracted and stored as described herein.

Figure 7:
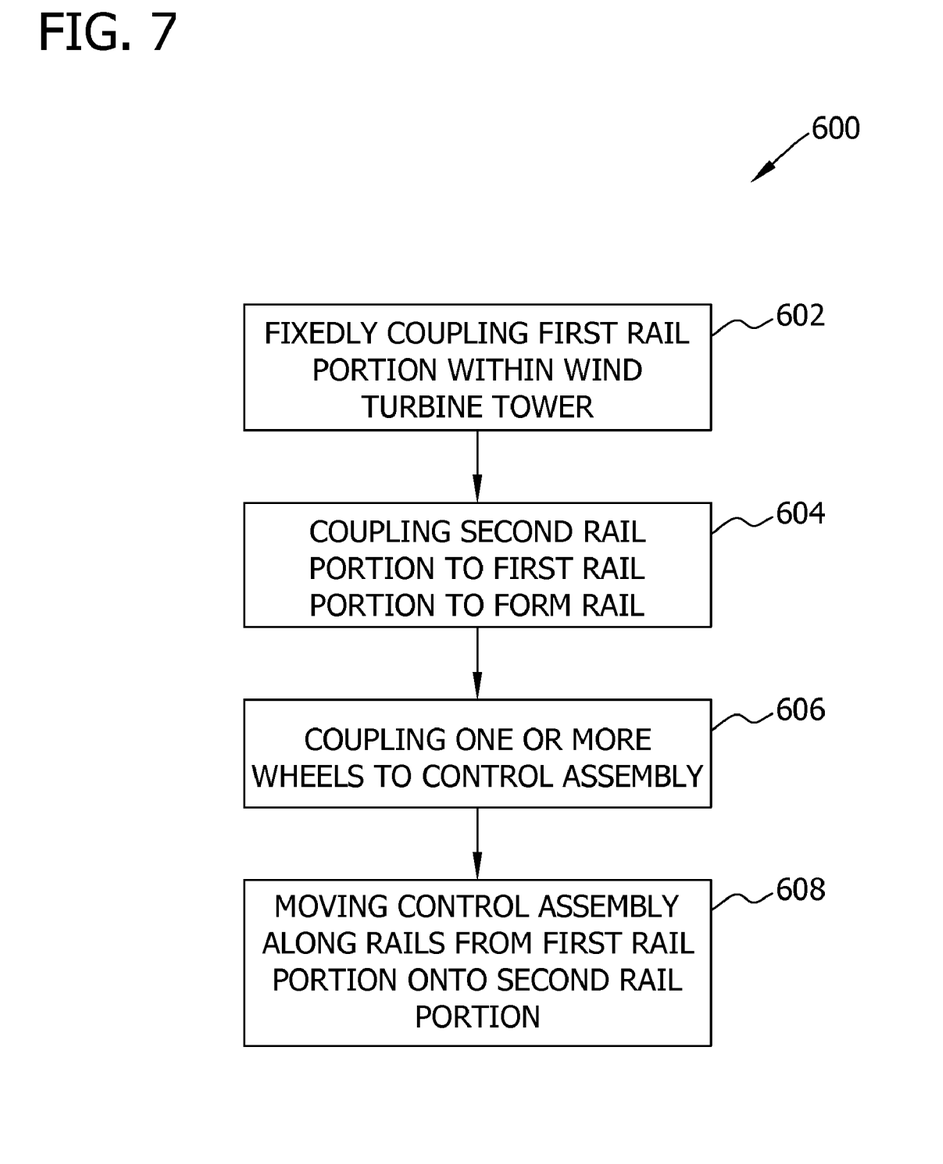
FIG. 7 is a flow diagram of an exemplary method of performing maintenance operations on a wind turbine.

FIG. 7 is a flow diagram of an exemplary method 600 for performing maintenance on a wind turbine, such as wind turbine 100. In the exemplary embodiment, method 600 includes fixedly coupling 602 first rail portion 252 within tower 102. Second rail portion 254 is then coupled 604 to first rail portion 252 to form rail 250 such that second rail portion 254 extends outwardly through access opening 224 when coupled to first rail portion 252. In the exemplary embodiment, second rail portion 254 is removably coupled to first rail portion 252. In alternative embodiments, second rail portion 254 is slideably or extendably coupled to first rail portion 252, such as in a telescoping configuration, or pivotally or rotatably coupled to first rail portion 252 using a suitable coupling or fastening device (not shown). In certain embodiments, second rail portion 254 can be retracted or decoupled from first rail portion 252 to facilitate storing second rail portion 254 when not in use.

In the exemplary embodiment, method 600 includes coupling 606 one or more wheels to the control assembly. For example, in one embodiment, a plurality of wheels 270 are coupled to the control assembly and engage one or more corresponding rails 250 to facilitate movement of the control assembly along rails 250. The control assembly is moved 608 along rails 250 from first rail portion 252 through access opening 224 and onto second rail portion 254 that extends outwardly from access opening 224 to facilitate movement of the control assembly between an interior and an exterior of the tower and performing maintenance on the wind turbine.

Exemplary embodiments of maintenance systems for wind turbines are described in detail above. The above-described systems and methods facilitate servicing the wind turbine and control assemblies. More specifically, moving the transformer outside of tower facilitates repairing and/or replacing the transformer without the need for a large terrestrial crane and/or a marine crane. The systems and methods described herein reduce costs associated with the use of such heavy moving equipment during maintenance operations and reduce maintenance costs and repair times while eliminating wait times for an available crane. Additionally, the systems and methods described herein provide greater access and maneuverability during maintenance on other control assembly equipment housed within the tower. The ability to move the transformer or any component or control assembly from inside the tower to a stable position outside of the tower provides work crews with the ability to move other components and control assembly equipment within tower for easier handling.

Moreover, the system and methods described herein overcome many of the deficiencies realized in a crane-based system. The complexity and difficulty associated with use of the crane-based system is substantially reduced. Additionally, the system and methods described herein require no electrical energy to power. As such, the system has substantially higher efficiency when compared to a crane-based maintenance systems.

Although the apparatus and methods described herein are described in the context of maintenance systems for wind turbines, it is understood that the apparatus and methods are not limited to such applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system to facilitate maintenance on a wind turbine including a control assembly positioned within a tower defining an access opening, said system comprising:

at least one rail comprising a first rail portion and a second rail portion coupled to said first rail portion, said second rail portion extending outwardly through the access opening when coupled to said first rail portion; and, at least one wheel coupled to the control assembly, said wheel configured to engage said rail and enable movement of the control assembly along said rail to facilitate movement of the control assembly between an interior and an exterior of the tower.

2. A system in accordance with claim 1, wherein said first rail portion is supported within the tower by a floor of the tower.

3. A system in accordance with claim 2, wherein said first rail portion is received within a channel defined in the floor such that a top surface of said first rail portion is substantially coplanar with the floor.

4. A system in accordance with claim 1, wherein said first rail portion is supported within the tower by at least one support extending between a floor of the tower and said first rail portion.

5. A system in accordance with claim 1, further comprising at least one leg configured to support said second rail portion when said second rail portion is coupled to said first rail portion.

6. A system in accordance with claim 1, wherein said wheel defines a recess about a peripheral surface of said wheel sized to receive said rail.

7. A system in accordance with claim 1, wherein said second rail portion is one of removably coupled, slidably coupled, and pivotally coupled to said first rail portion.

8. A wind turbine, comprising:
a tower defining an access opening;
a control assembly positioned within said tower; and,
a rail assembly comprising:
   at least one rail comprising a first rail portion and a second rail portion coupled to said first rail portion, said second rail portion extending outwardly through the access opening when coupled to said first rail portion; and,
   at least one wheel coupled to said control assembly, said wheel configured to engage said rail and enable movement of said control assembly along said rail to facilitate movement of said control assembly between an interior and an exterior of said tower.

9. A wind turbine in accordance with claim 8, further comprising a floor, wherein said first rail portion is supported within said tower by said floor.

10. A wind turbine in accordance with claim 9, wherein said floor defines a channel sized to receive said first rail portion such that a top surface of said rail is substantially coplanar with said floor.

11. A wind turbine in accordance with claim 8, further comprising at least one support extending between a floor of said tower and said first rail portion.

12. A wind turbine in accordance with claim 8, further comprising at least one leg configured to support said second rail portion when said second rail portion is coupled to said first rail portion.

13. A wind turbine in accordance with claim 8, wherein said wheel defines a recess about a peripheral surface of said wheel sized to receive said rail.

14. A method of performing maintenance on a wind turbine, the wind turbine including a tower defining an access opening, said method comprising:
fixedly coupling a first rail portion within the tower;
coupling a second rail portion to the first rail portion to form a rail, the second rail portion extending outwardly through the access opening when coupled to the first rail portion; and,
coupling at least one wheel to a control assembly, the wheel configured to engage the rail and enable movement of the control assembly along the rail to facilitate movement of the control assembly between an interior and an exterior of the tower.

15. A method in accordance with claim 14, further comprising one of removing, retracting, and pivoting the second rail portion following maintenance on the wind turbine.

16. A method in accordance with claim 14, wherein fixedly coupling the first rail portion within the tower comprises supporting the first rail portion on a floor of the tower.

17. A method in accordance with claim 16, further comprising supporting the first rail portion within a respective channel defined within the floor and sized to receive the first rail portion such that a top surface of the first rail portion is substantially coplanar with a top surface of the floor.

18. A method in accordance with claim 14, wherein fixedly coupling the first rail portion within the tower comprises supporting the first rail portion with at least one support extending between a floor of the tower and the first rail portion.

19. A method in accordance with claim 14, further comprising extending from the second rail portion at least one leg that is configured to support the second rail portion when the second rail portion is coupled to the first rail portion.

20. A method in accordance with claim 14, further comprising moving the control assembly from the first rail portion to the second rail portion to facilitate performing maintenance on the wind turbine.

* * * * *